(12) United States Patent  
Haller et al.

(10) Patent No.: US 7,543,292 B2  
(45) Date of Patent: Jun. 2, 2009

(54) METHOD AND COMPUTER SYSTEM FOR WORKFLOW CONTROL

(75) Inventors: Jochen Haller, Karlsruhe (DE); Philip Robinson, Karlsruhe (DE); Yuecel Karabulut, Karlsruhe (DE)

(73) Assignee: SAP AG, Walldorf (DE)

( * ) Notice: Subject to any disclaimer, the term of this patent is extended or adjusted under 35 U.S.C. 154(b) by 198 days.

(21) Appl. No.: 11/311,901

(22) Filed: Dec. 19, 2005

(65) Prior Publication Data  
US 2006/0161272 A1    Jul. 20, 2006

(30) Foreign Application Priority Data  
May 11, 2005   (EP)   ................... 05103915

(51) Int. Cl.  
*G06F 9/46*   (2006.01)
(52) U.S. Cl. ...................... 718/100; 718/106
(58) Field of Classification Search ................ 717/101, 717/104; 718/100, 106  
See application file for complete search history.

(56) References Cited  
U.S. PATENT DOCUMENTS

| | | | |
|---|---|---|---|
| 7,069,234 B1 * | 6/2006 | Cornelius et al. | 705/26 |
| 7,289,966 B2 * | 10/2007 | Ouchi | 705/7 |
| 2002/0161688 A1 * | 10/2002 | Stewart et al. | 705/37 |
| 2004/0078258 A1 * | 4/2004 | Schulz et al. | 705/9 |
| 2004/0078373 A1 * | 4/2004 | Ghoneimy et al. | 707/10 |
| 2004/0083448 A1 * | 4/2004 | Schulz et al. | 717/101 |
| 2004/0187089 A1 * | 9/2004 | Schulz | 717/101 |
| 2005/0108074 A1 * | 5/2005 | Bloechl et al. | 705/8 |

* cited by examiner

*Primary Examiner*—Andy Ho  
(74) *Attorney, Agent, or Firm*—Brake Hughes Bellermann LLP

(57) ABSTRACT

A computer system, method and computer program for controlling a workflow process. A process modeling unit is configured to define a process model with at least a first task and a second task, wherein the second task needs to comply with a control aspect and depends on the first task, and is further configured to insert into the process model a control task between the first and the second task, wherein the control task is configured to enforce the control aspect on the second task by using a control service of a subsystem. A process execution unit of the system is configured to generate a process instance from the process model and to instantiate a control context to capture the current state of the process instance, the control context being used by an instance of the control task to invoke the control service according to the control aspect.

22 Claims, 6 Drawing Sheets

900 computer system at runtime

900 computer system at design time

METHOD AND COMPUTER SYSTEM FOR WORKFLOW CONTROL

CROSS REFERENCE TO RELATED APPLICATION

This application claims priority under 35 U.S.C. 119 to European Application No.: 05103915.4, filed on May 11, 2004 and titled "METHOD AND COMPUTER SYSTEM FOR WORKFLOW CONTROL," which is incorporated by reference in its entirety.

TECHNICAL FIELD

This description generally relates to electronic data processing, and more particularly, relates to methods, computer program products and systems for workflow control.

BACKGROUND

In today's economy, in many areas collaboration between organizations is becoming an essential requirement to meet objectives. Collaboration between organizations typically involves extended negotiations between humans in order to come to terms with, for instance, a set of legal documents, formalising the collaboration in contractual form. Depending on the type of objective, the collaboration has to be reflected to a varying extent on the Information and Communication Technology (ICT) layer as well.

An example for such a collaborative environment is a Virtual Organization (VO). A VO is defined as a temporary or permanent coalition of geographically dispersed individuals, groups, organizational units or entire organizations that pool resources, capabilities and information to achieve common objectives. Security requirements are of major concern because such a collaboration typically involves a great deal of exposure of confidential data of the various VO members. Otherwise independent organizations may even participate in more than one VO at a time where the VOs are in direct competition to each other.

Typically, collaborations may be modelled in terms of the corresponding workflow processes. Such processes may include tasks which are to be performed by the various VO members within their respective domains. Certain tasks may need to comply with certain control aspects, that is, for example a specific task may only be performed by a person in a specific role to ensure that the person is authorized to perform the task.

One implementation to deal with this process control issue regarding the authorization example in the past was to add a corresponding authorization object to the coding of a respective task of the workflow process. This was typically done manually by a programmer. Another implementation to deal specifically with authorization control issues includes task based authorization instead of an object based authorization. Under this approach an authorization step is introduced into the process model. The authorization step can be considered as the analogon of a single act of granting a signature in the paper world. The authorization step is associated with a group of trustees and corresponds to a task within the broader context of a workflow. One member of the trustees will eventually grant the authorization-step when the authorization-step is instantiated. Permissions required to invoke and grant the authorization step as well as permissions that are enabled by every authorization-step are modelled for each authorization step in the process. Each authorization step may include the information about a corresponding authorization table where the respective authorization information can be found.

SUMMARY

In one aspect a computer system allows control of a workflow process in a more flexible and less complex way. The computer system includes a process modelling unit that is configured to define a process model with at least a first task and a second task. The second task needs to comply with a control aspect and depends on the first task. Further, the process modelling unit is configured to insert into the process model a control task between the first and the second task. The control task is configured to invoke a control service to enforce the control aspect on the second task. A process execution unit of the computer system is configured to generate a process instance from the process model and to instantiate a control context. The control context can capture the current state of the process instance and is used by an instance of the control task to invoke the control service according to the control aspect.

In addition to the process layer of the process modelling and execution units a service layer for control services is introduced. The concept of combining the control context with the service layer which provides control services enables the control task to dynamically identify at runtime a path to a subsystem that provides a control service according to the control aspect. At design time, the control task does not need to have a rigid link to the control service. This information can become available at runtime within the control context which enables the control task instance to submit a call to the respective control service at runtime.

In other words, task instances at the process layer can control all control aspects of a process instance by applying appropriate service based process control mechanisms. Such control aspects may relate to:

trust—in case the collaboration, which is modelled by the process model, has to be conducted in a reliable and dependable environment with partners having the same properties throughout the collaboration. During runtime, trust or reputation levels of VO participants should be verifiable. Therefore, the notion of trust is based on reliable behaviour of partners participating in the VO. In case of erratic or unexpected partner behaviour, differences are measured against the expected behaviour fixed in an agreed upon contract. Thereby, trust is inherently subjective whereas reputation is usually aggregating and weighting trust and, therefore, tends to be objective with respect to its target;

security—in case the collaboration environment has to meet the security requirements of all participating partners and offer controls to monitor, adapt and enforce such requirements throughout the collaboration. Besides the basic message security requirements, authentication, authorization, integrity, confidentiality and non-repudiation, policies can be an integral part to declare and specify more complex security requirements. Policies can facilitate the understanding and enforcement of declared security/contract/trust requirements across and within administrative domains.

contracts—in case the collaboration between partners is to be formalized and contract terms have to be enforced and monitored throughout the collaboration. Contracts in the form of Service Level Agreements (SLAs) can play a central role in the set-up and administration of a VO. Most parameters for VO management processes can be automatically derived from SLAs even during business process runtime.

Complex collaborative environments, encompassing different autonomous partners have a need for automation and flexibility. In the context of Virtual Organizations collaborative processes are an integrating component bringing together other VO components and subsystems, such as, for example a policy infrastructure or contract management while still meeting the requirements regarding flexibility. Such a complex collaboration environment as the one encountered in VOs can benefit from an integrated security model that supports various classes of VOs or catering for VOs, for instance, in aggregated service provisioning or collaborative engineering. Such an integrated security model may as well take into account the integrating component (collaborative processes). A business process model, offering techniques to controllably expose internal processes of an organization can interface with other security and contract management related VO subsystems, such as a policy infrastructure. The disclosed process model supports process context aware security controls for and towards those subsystems within executable collaborative process instances.

Further aspects may be described in the form of a method and/or as a computer program product to execute such a method (or a similar method). Such a method may be used for controlling a workflow process represented by a process instance and including at least a first task instance and a second task instance, wherein the second task instance is associated with a control aspect. The method further includes use of a control task instance to enforce the control aspect on the second task instance. In the method, a control context is instantiated. An extension role is instantiated, wherein the extension role is a control aspect specific function configured to support a control decision with respect to the control aspect. The extension role is assigned to the control task instance, and attributes of the control task instance are set by retrieving a control task instance specific attribute data subset from the control context. The control task instance according to the assigned extension role is executed, and a control service of a subsystem is invoked according to the extension role and the specific attribute data subset of the control task instance. A control service decision is received from the control service, wherein the control service decision corresponds to the control decision for the control aspect, and the process flow of the process instance is controlled according to the control service decision.

The workflow control method enables dynamic control of any control aspect of a workflow process without requiring the workflow engine for process execution to be a trusted and secure system. Control decisions may be taken by control services in a trusted environment and provided to the workflow process instance at runtime, where they may be applied to the corresponding task instances by way of the control task instance.

The aspects of the invention will be realized and attained by means of the elements and combinations particularly pointed out in the appended claims. It is to be understood that both the foregoing general description and the following detailed description are exemplary and explanatory only and are not restrictive of the invention as described.

DETAILED DESCRIPTION

Figure 1:
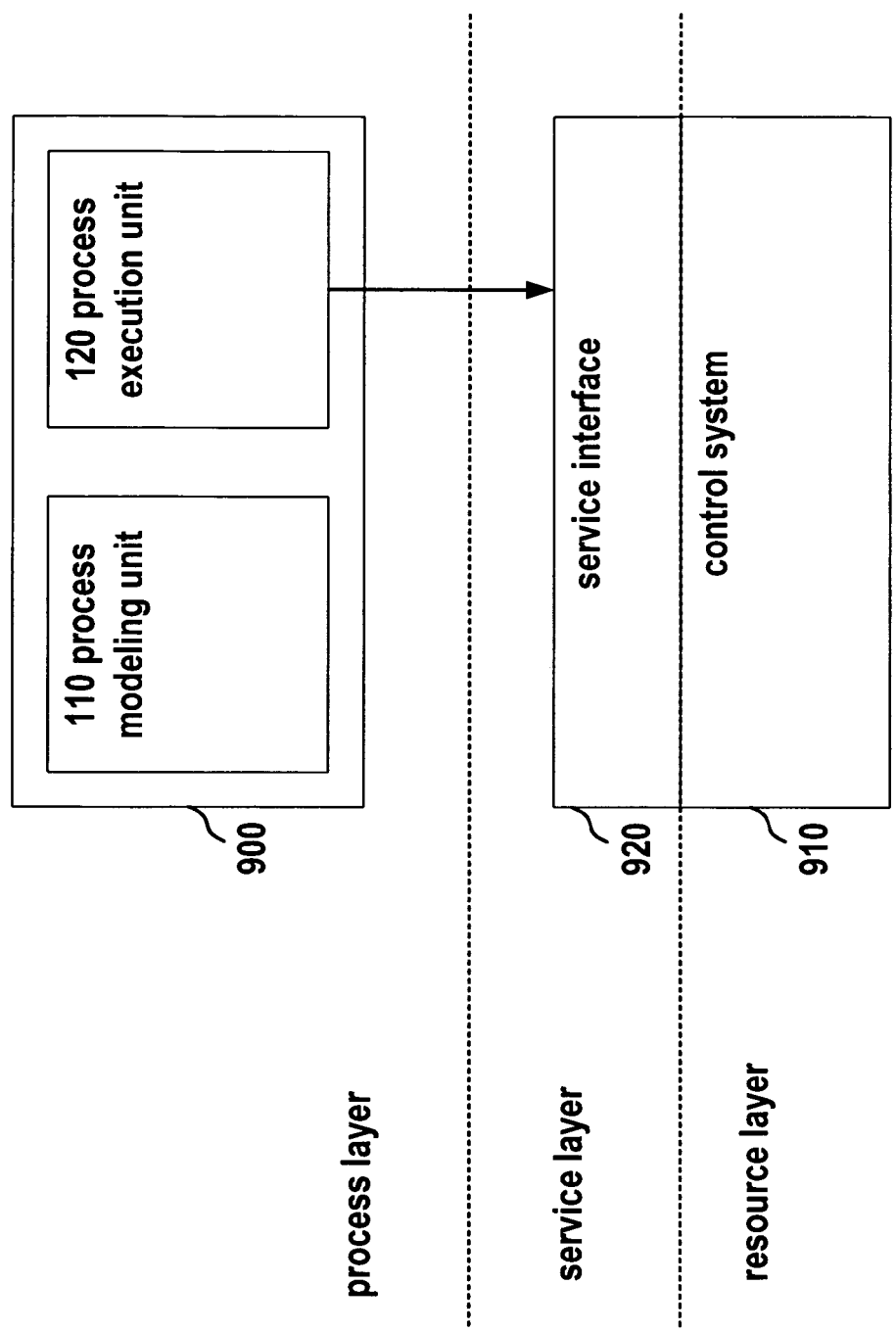
FIG. 1 shows a three layer model with a computer system for controlling a workflow process.

FIG. 1 illustrates an example of a three layer model including a computer system 900 for controlling a workflow process.

The computer system 900 can be considered to be at the process layer level, which is the top level layer of the three layer model. The computer system 900 includes a process modelling unit 110, which is configured to define a process model, and further includes a process execution unit 120, which is configured to generate a process instance from the process model.

The further layers of the three layer model are a service layer and a resource layer. A control system 910 that provides services to control the execution of the process instance can be implemented having a service interface 920 at the service layer gating the access to a control service implementation which in turn regulates the access to a resource at the resource layer. The service interface 920 is callable from the process execution unit 120, which is illustrated by the arrow.

The control system 910 can provide control services to cover all different kinds of control aspects, such as security aspects, trust aspects or contract aspects of various elements of the process instance. For example, elements of the process instance can be instances of various tasks of the process. Each task can have one or more different control aspects because each task may be performed by different people or systems requiring, for example, a combination of different authorizations or a different trust status.

The control system can include subsystems for the different control aspects, such as, for example, a subsystem for enforcing an authorization policy and a subsystem providing trust and reputation values.

Figure 2B:
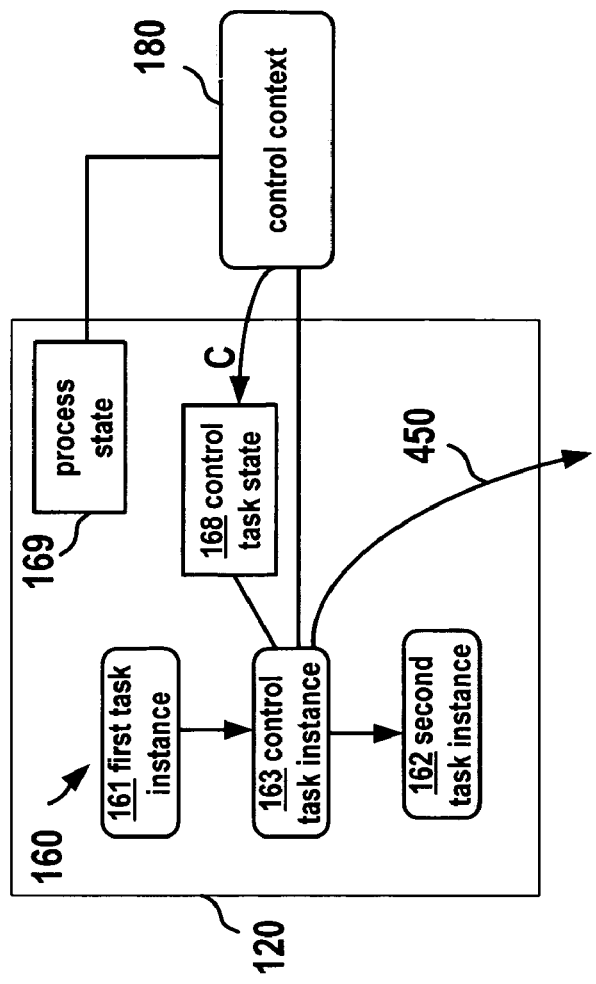
FIG. 2B is a simplified block diagram of runtime components of the computer system.
Figure 2A:
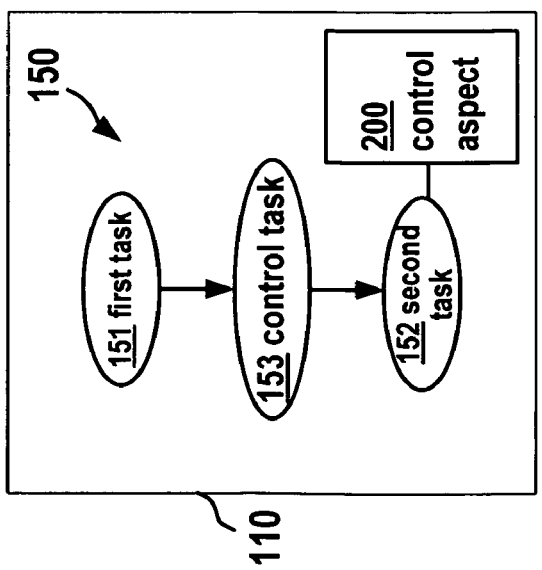
FIG. 2A is a simplified block diagram of design time components of the computer system.

FIGS. 2A and 2B illustrate portions of the computer system 900 for controlling a workflow process at design time and at runtime.

In FIG. 2A, at design time, the computer system 900 includes a process modelling unit 110, which is configured to define a process model 150 with at least a first task 151 and a second task 152. Processes typically include a plurality of tasks, which are executed in a pre-ordained order. The outcome or result of a task is able to influence the subsequent order of tasks in the process enactment. This ordering of tasks is represented as transitions between tasks. A task can be a process component describing an activity or altering the process control flow, for instance splitting or joining the process flow. A process may contain different layers of detail. For example, in the process model 150, a task can be a placeholder for a sub-process. A further process component is a transition connecting tasks with each other. Transitions are illustrated by arrows from one task to another task. A transition has a source and a destination and is unidirectional.

In the example of FIG. 2A, the first task 151 corresponds to the "begin" of the process model, whereas the second task 152 corresponds to the "end". The process model can be visualised as a directed graph which is similar to the Business Process Modelling Notation (BPMN) or various other established graphical BP modelling notations.

The process modelling unit 110 can be based on a workflow modelling language, such as the Workflow Process Definition Language (WPDL), the Event-based Workflow Modelling Language EventFlowL or UML based languages.

Typically the process modelling unit 110 may include a graphical user interface, which supports the designer of a process with all kinds of editing functions to graphically define the process with its various components. For example, UML activity diagrams, Petri Nets or Swim Lane Diagrams may be used to provide a mechanism for visualizing and optimizing complex processes. These diagrams organize processes across functional boundaries, and enable designers to view processes, roles and responsibilities.

In the example of FIG. 2A, the second task 152 needs to comply with a control aspect 200 and depends on the first task 151. That is, the second task may not be executed before the first task has been finished and encounters some restrictions with regards to its executability. In other words, the second task may only be executed if some condition is met, such as for example, the user who tries to execute the second task belongs to a group of users having the corresponding permissions.

The process modelling unit 110 can insert a control task 153 between the first and the second task in the process model 150. The insertion of the control task may be triggered by the designer of the process or may be initiated by the process modelling unit itself because of design rules following a design pattern based approach implying that the control task may be needed for enforcing the control aspect 200 on the second task. The control task 153 is configured to invoke a control service to enforce the control aspect 200 on the second task 152.

In FIG. 2B, at runtime, the computer system 900 includes a process execution unit 120 to execute the process model 150. The process execution unit 120 generates a process instance 160 from the process model 150 (cf. FIG. 2A), which, as shown in FIG. 2B, may include a first task instance 161, a control task instance 163, and a second task instance 162. Further, the process execution unit 120 can instantiate a control context 180 to capture the current state 169 of the process instance 160. In other words, the control context can store process instance wide data for all control tasks in the process instance, wherein the data includes information which can be used by the control tasks to perform their duties. The control context 180 can exist outside the process execution unit 120, for example, within a database environment that can communicate with the process execution unit. It is also possible to store the control context within a memory portion that is part of the process execution unit.

The current state 169 of the process instance 160 may include state information, such as such as time, date, process ID, etc.

The control context 180 can then be used by an instance 163 of the control task 153 to invoke 450 the control service according to the control aspect 200. The implementation of the control service can be hidden behind a web service interface (cf. FIG. 1) and can be invoked 450 by the control task instance 163 from within the process level (cf. FIG. 1).

The control task 153 is an initially generic, neutral task that is modelled at design time in the process model 150 whenever a control aspect specific function during runtime is required for a control decision within the corresponding process instance 160. The specific function of the control task can be assigned to the control task at design time or can be deduced at runtime. Such a specific function of the control task can be considered as a role performed by the control task that extends its normal function as a task within the workflow process. Therefore, in the following, such specific functions are referred to as extension roles of a control task. Extension roles may be classified into functions related to trust, security and contract management or monitoring related functions. Those functions may be implemented on the service layer and can be invoked by their service interfaces (cf. FIG. 1). For example, subsystems providing trust, security or contract management services can report notifications through a further monitoring subsystem, which may affect control task extension role assignments to the corresponding control task instance at runtime.

The control context 180 can capture the current state 169 of the process instance 160 and is used by the control task instance 163 to fulfil its extension role. The control context 180 may include control related metadata, such as references to active policies or security level agreements (SLA), and provides information about interfaces to control services like policy control object or SLA parser.

A control context may be implemented according to a specification as described in table 1.

TABLE 1

| | specification example for control context | | | |
|---|---|---|---|---|
| Category | Method | Field | Type | Description |
| Metadata | getProcessInstanceRef( ) | ProcessInstanceRef | processID | Reference to current process instance |
| | getDomainRef( ) | DomainRef | domainID | Reference to administrative domain currently running current process instance |
| | getCollabDefRef( ) | CollabDefRef | {CBP, {ViewRef}, {myPrivProcRef}} | Reference vector to related collaboration definition, views and private processes in the same domain; delivers own process type |
| | getCurrentTaskRef( ) | taskID | taskID | Reference to currently executed task |
| Authorization | Mode( ) | processID[, domainID] | {TBAC, CAP} | Authorization Model |
| | PartnerRoleProcess( ) | processID[, domainID] | {Role} | Role under which the process instance is executed |
| | PartnerRole | taskID[, | {Role} | Role assigned to a particular task |

TABLE 1-continued specification example for control context

| Category | Method | Field | Type | Description |
|---|---|---|---|---|
| | Task( ) | processID, domainID] | | under which it is executed |
| | PermCheck( ) | taskID[, processID, domainID] | {permResult} | Check task permissions of the current task |
| Policy | Policy Instances( ) | taskID[, processID, domainID] | {policy} | Set of policies having a task stated as a target |
| | PolicyType( ) | policyID[, domainID] | {Obligation, Delegation, Refrain, Authorization} | Type of a particular policy; suitable for invocation of policy control object methods |
| | Verify( ) | policyID[, domainID] | boolean | Verify enforcement state of a policy |
| | Adapt( ) | policyID[, domainID] | boolean | Adapt an existing policy, wherein the policyID refers to the already updated policy |
| | Deploy( ) | policyID[, domainID] | boolean | Deploy a policy |
| | getPolState( ) | PolState | Vector | VO Management Alert Vector for Policy Violations |
| SLA | Verify( ) | slaID[, domainID] | boolean | Verify the enforcement state of a particular SLA |
| | Deploy( ) | slaID[, domainID] | boolean | Deploy an already negotiated SLA |
| | Renegotiate( ) | slaID | boolean | Renegotiate an established SLA in case of violation |
| | Translate( ) | slaID | policyID | Translate terms of an established SLA into (obligation) policies |
| | getSLAState( ) | SLAState | Vector | VO Management Alert Vector for SLA Violations |
| Trust | getTrustLevel( ) | [domainID, processed, tasked] | tbd | Get trust level of a particular target via the trust kernel |
| | Reputation( ) | domainID | tbd | Get trust level of a particular partner (domain) via the trust kernel |
| Monitoring | setMode( ) | [Pull, Push] | boolean | Set mode for the monitoring infrastructure |
| | getMonConfiguration( ) | monConfiguration | tbd | Get current monitoring configuration |
| | getMonState( ) | domainID | Vector | VO Management Alert Vector for detecting monitoring faults |

A control context may include, for example, various metadata fields and corresponding methods that relate to the current process instance 160; fields and corresponding methods that relate to authorization issues within the process instance 160. those fields may actually contain URIs and method invocations which maybe URL-encoded; fields and corresponding methods that relate to the enforcement of policies and trust issues in the process instance 160; and fields and corresponding methods that relate to the monitoring of subsystems, e.g., a membership subsystem for verifying whether the required collaborating user/partner is still a VO member and, if not, raising corresponding alert notifications in the process instance 160.

Extension roles can be reflected in the functions of the control context content associated with a process instance. The control context content provides the decision basis for control decisions related to the control aspect during process execution. For example, control decisions can be decisions with respect to authorization, monitoring or policy adaptation.

A particular control task instance 163 is associated with process state information related to the control task instance 163. This process state information will be referred to as control task state 168. The control task state 168 captures (illustrated by arrow C) a control decision relevant subset of the control context for the particular control task instance 163. Examples of control task state content are access control/permission, SLA references or policy references. The process execution unit 120 may reserve some memory space for instantiated process objects, such as a specific control task. The control task state can be structured like a table. This table can be implemented associated with the control task, for example, by defining attributes for the control task.

The lifetime of a particular control context instance 180 can be bound to the lifetime of the corresponding process instance 160. In one implementation, the control context 180 does not contain confidential or security critical data but is merely referencing the data, such as active policies or access control lists which in turn are properly handled by their respective subsystems. In this implementation, critical data are not part of the workflow system, which may not be a trustworthy system. The critical data are stored and handled in trustworthy subsystems at the resource/service layer.

Figure 3:
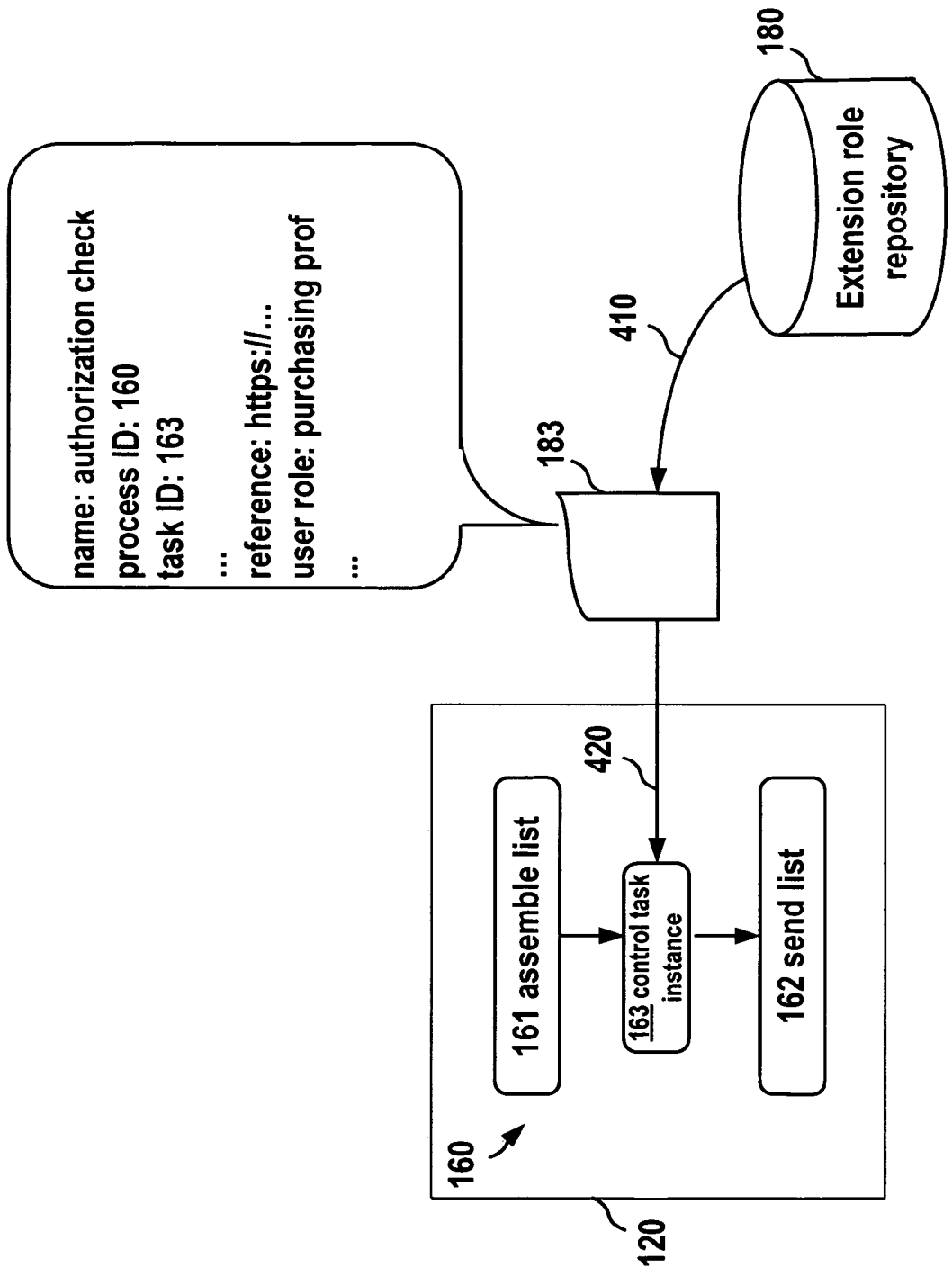
FIG. 3 illustrates details of an extension role assigned to a control task instance at runtime.

FIG. 3 illustrates details of an extension role 183 assigned to the control task instance 163 at runtime.

For example, the process model 150 (cf. FIG. 2A) may be part of a purchase order process. In this example, the first task 151 may be to assemble a list of items to be ordered and the second task 152 may actually send the list.

The first task 151 and the second task 152 may be executed by two different users. Since only authorised users are allowed to send orders to a supplier (control aspect 200, cf. FIG. 2A), the authorization of the user executing the second task needs to be verified. According to one example embodiment of the invention, authorization s are not verified on the process level, but by an appropriate authorization subsystem (e.g., control system 910, cf. FIG. 1) on the resource layer, below the service layer. The authorization subsystem offers a service interface (authorization service) at the service layer as an access channel for the control task 153 on the process layer.

Assuming that the requirement of an authorization check is not known at the design time of the process model 150, the control task 153 can be configured accordingly at runtime during the execution of the process instance 160 to perform its duty. Configuration of the control task instance 163 at runtime is done by the process execution unit 120 in that it assigns 420 a corresponding extension role 183 to the control task 163. In the above scenario, the extension role "authorization check" can be assigned to the control task. For example, the extension role can be implemented as an XML document, a flat text file, a table object or a comma separated list that includes all the information to configure the control task accordingly.

For example, the extension role may contain:
name of the extension role;
control task ID and process ID;
metadata, such as author, timestamp, etc.;
references, such as URIs to be accessed at execution time of the control task, such as for example the URL of the corresponding authorization service;
parameters for the service call, such as for example a set of allowed users or a reference to an external user directory;
signature or similar integrity mechanism.

The content of the extension role is illustrated by the content bubble next to the extension role document 183.

The above extension role data may be entered manually by a user or can be retrieved automatically by the process execution unit 120. For example, role templates or templates containing service URLs to access data, such as user names, can be retrieved at runtime from respective repositories 180.

The extension role 183 may be deployed into the process execution unit 120 that executes the process instance 160 and into supporting subsystems, such as communication queues, as an XML document through a service interface. The control task ID and process ID are used to map the extension role to a unique control task instance in a specific process instance. In one implementation, the assignment 420 of the extension role to the control task occurs prior to the execution of control task instance 163. Otherwise, the process execution unit raises an exception.

In an alternative implementation, besides sending actively a request to a subsystem, the control task can also receive notifications from subsystems. This enables the control task to flexibly perform its control decision making task during runtime using real-time monitoring data as the basis for its decision process as well. For capturing real-time monitoring data the control task may invoke corresponding messaging services or may be notified by a corresponding monitoring subsystem. To enable the control task to use monitoring real-time data a corresponding monitoring extension role can be assigned to the control task. The monitoring extension role can allow the control task to flexibly interact with different monitoring subsystems.

Figure 4:
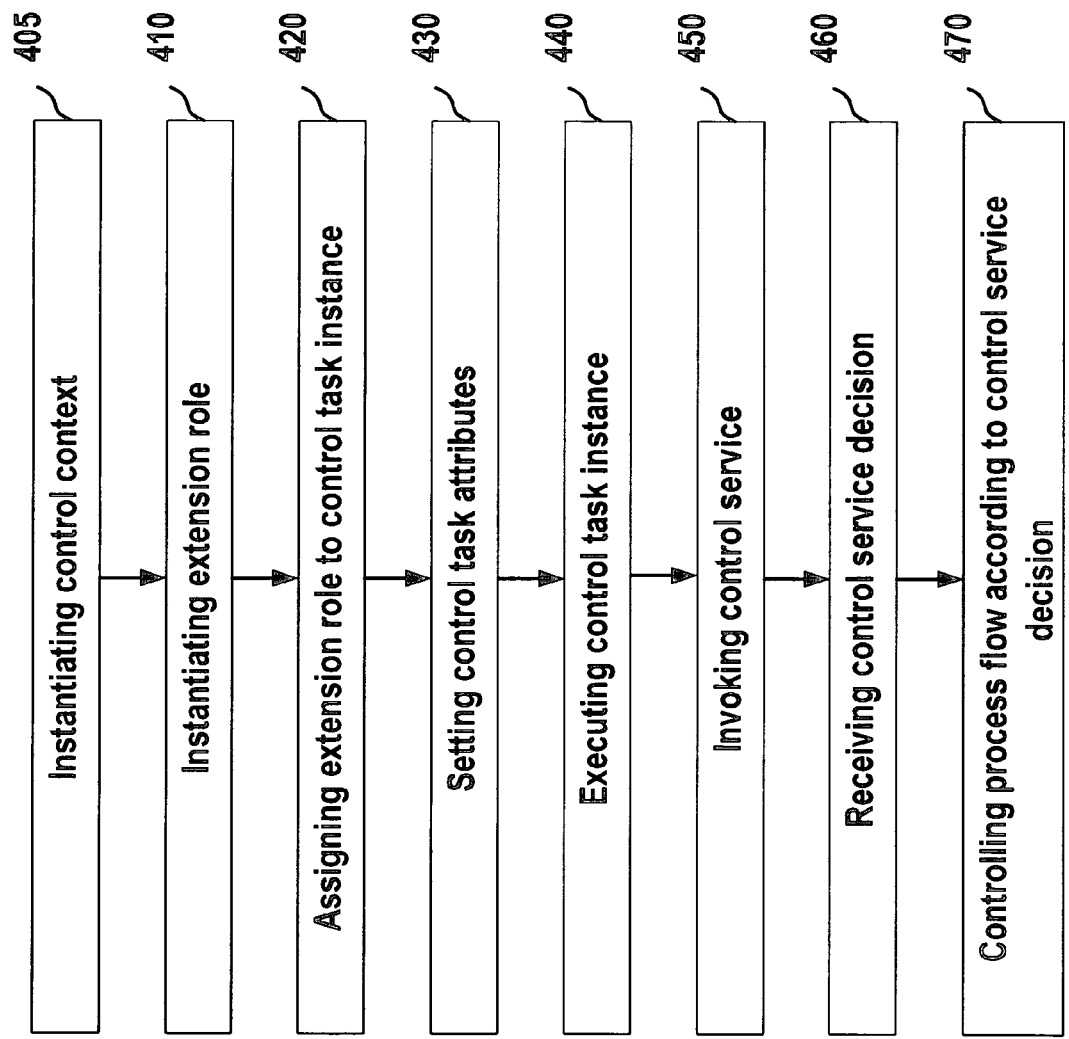
FIG. 4 is a simplified flowchart of a method executed at runtime for controlling a workflow.

FIG. 4 is a simplified flowchart of a method 400 executed at runtime for controlling a workflow.

The following may be performed by the process execution unit 120. A control context 180 may be instantiated (405). For example, the control context may be instantiated with the process instance 160 and assigned to the process instance. The control context may be implemented as a table or a structured document (e.g., an XML document). The process execution unit can make metadata, such as time, date, process ID, etc., available to internally executed process instances. Gathering of the metadata is typically performed by an environment function of the process execution unit itself. This metadata is part the process state 169. Right after the instantiation, the control context can capture those metadata, such as for example, the process ID of the process instance that it is assigned to. The control context can be partitioned according to control service subsystems which may be called by control task instances. For example, one section of the control context may refer to an authorization service subsystem, another to a monitoring service subsystem. The integration with subsystems makes the Workflow system flexible because any service oriented subsystem for enforcing any policy can be invoked as described below (440).

Further data can be filled into the control context upon an extension role assignment to the corresponding control task (cf. 420). The control context can include references to subsystems which in turn handle confidential data. Since handling of such references can be critical, the control context can be stored separate from the process execution space that it refers to, for example, in a trusted system, such as a database accessible by the process execution unit.

In an alternative implementation, in case critical aspects of the workflow are already known at design time, a control context can already be fully initialized at design time while modelling the corresponding control task.

An extension role 183 may be instantiated (410). For example, the extension role may be instantiated as a structured document (e.g., an XML document) from a corresponding template in an extension role repository.

The extension role 183 may be assigned to a control task instance 163 (420). For example, the assignment may be initiated manually by a user in a form on a html page, graphically in a process editor or by an automated subsystem on the basis of the role documents.

Attributes of the control task instance 163 may be set (430). To set the attributes the process execution unit can retrieve the right attribute data subset (control task state) from the control context for each control task. Such attributes may include, for example, a header part, a role name, actual data, such as the URL and parameters to invoke the authorization service, needed for later executing the control task, as well as references to those entries in the control context. For example, in the case of a reference the process execution unit can add a pointer in the corresponding control task attribute that points to the a location (e.g., row numbers) in the control context where data is stored that is needed by the control task instance at execution time. The attributes of the control task instance 163 may be stored in an internal table. In case the process execution unit is not a trusted system it can be advantageous to store in the attributes references to the control context instead of the data values itself.

For example, an agent program can be used to fill in the control task attributes and the control context entries at runtime. Such an agent program describes a generic and (semi-) automated software acting on behalf of a user. In one implementation the agent can be an interpreted script (e.g., a perl or visual basic script). In another implementation the agent can be a subsystem containing a decision engine with a database for persisted storage (e.g., an ad-hoc workflow modeller).

For example, when an extension role document is deployed, the process execution unit can store the extension role data in the control context which may already be partly filled, at runtime. It may be difficult to predetermine those attribute entries and, therefore, the process execution unit adds a reference to the corresponding task attribute, when it stores the corresponding row in the control context. This can be done in a similar way as it is done for maintaining index tables when adding a new record to a database table.

The data can be identified according to the references stored in the attributes of the control task instance. The data can be stored temporarily in the control task state 168 in the execution space of the process instance 160. In the scenario discussed under FIG. 3, the control task instance is used to verify the authorization of the user for the send task instance 162. The corresponding authorization service URL and the parameters regarding the user (e.g., user name, user role) are retrieved from the control context and stored in the control task state 168.

The control task instance 163 may be executed according to assigned extension role(s) (440).

A control service may be invoked (450) according to an extension role of the control task instance and the specific attribute data subset 168 of the control task instance 163. In the scenario of FIG. 3, for example, the control task may invoke the authorization service at the corresponding authorization service URL with the parameter "user name" and the parameter "action" that indicates the action the user intends to perform in the following task instance. The authorization service implementation can consult an authorization subsystem (e.g., SAP central user administration or LDAP directory) for an authorization decision; the service implementation knows which subsystem to consult. The control task is not required to have that knowledge. It is sufficient for the control task to access the service interface.

A control service decision may be received from the control service (460). The control service decision (e.g., the authorization decision in the above scenario) is passed back to the control task by the control service implementation.

The process flow of the process instance may be controlled according to the control decision (470). The control task can control the further process flow after having received the control decision. For example, in the above scenario, in case the authorization decision from the authorization subsystem is "access allowed" the send task is allowed to be executed by the current user. Otherwise, the access would be denied and the process flow is continued with another task. In other words, the control task has the ability to route the process flow to alternative subsequent task instances dependent on the control decision.

Figure 5:
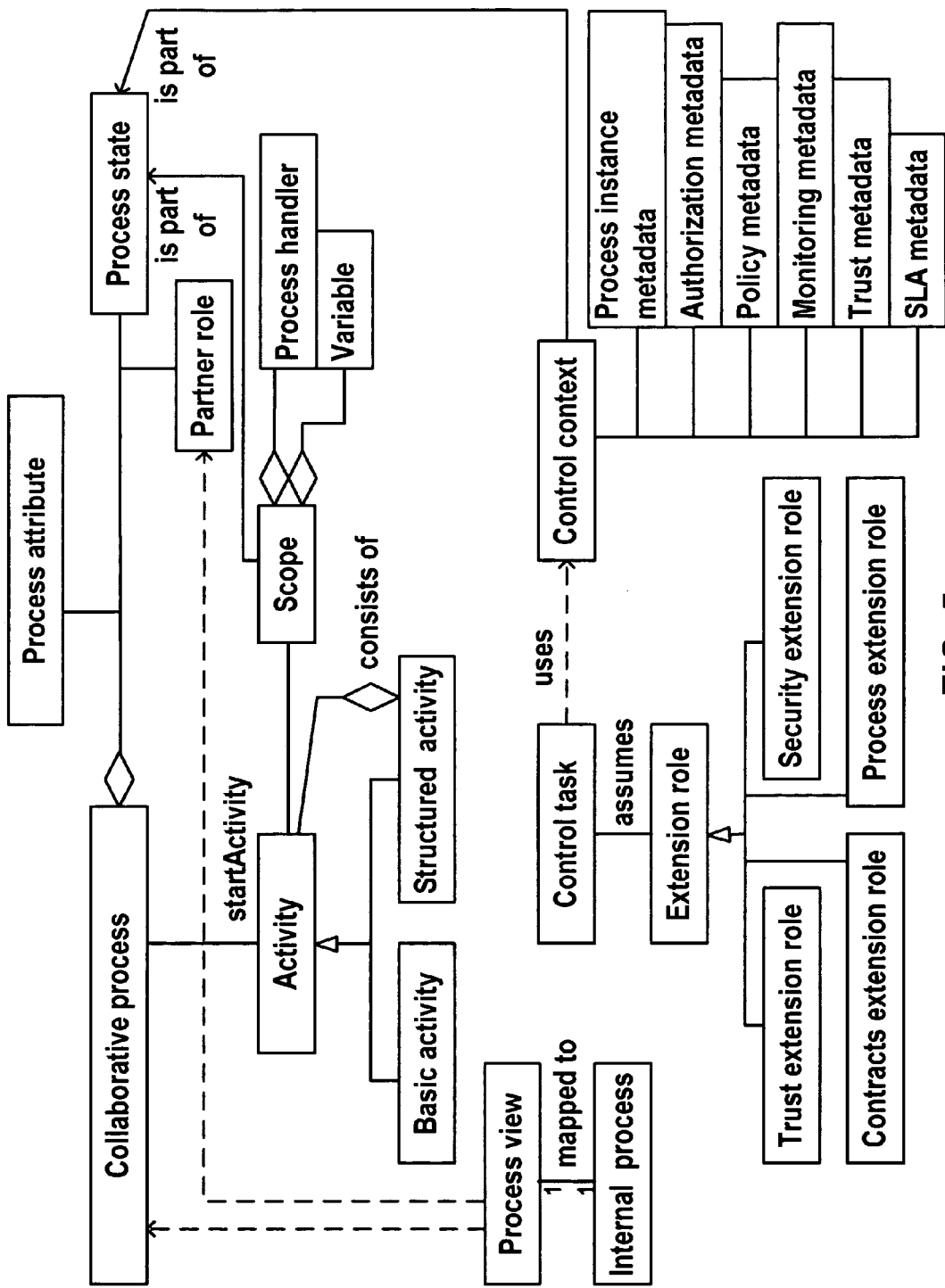
FIG. 5 is a Unified Modelling Language information model of process component classes to describe components of an example embodiment when used in collaborative process scenarios.

FIG. 5 is a Unified Modelling Language (UML) information model of Process Component Classes to describe components of an example embodiment of the invention when used in collaborative process scenarios. In a collaborative process various partners can collaborate across administrative domains in a VO. Typically, each partner acts within his own administrative domain.

The upper half of the diagram shows standard building blocks of processes, such as activities. For example, the activities can reflect the first and second task of the previously discussed examples. These building blocks are shown on a higher level of abstraction. In more specific process models several elements can be refined and described in more detail. One aspect of collaborative processes is that in a process view multiple partner roles can occur. All information that is available within the collaborative process can be reflected in the process state.

The lower part of the diagram illustrates how control tasks, extension roles and the control context complement the collaborative process model. The various extension role types and control context metadata types in the diagram are examples and not a complete list.

The Collaborative Process (CP) is the process that describes a message choreography among different VO partners on the highest level of detail in the VO. The CP describes the way how to meet a common objective of the VO. An external process can be derived from the collaborative process and represents a process view which can be exposed to other partners within the VO. Such a process view (or external process) maps to tasks in a CP assigned to one particular partner in the collaboration. Typically, highly optimised and tailored internal processes are assets of VO partners that require a certain degree of protection. Still, collaboration in a VO means that internal processes usually need to be exposed in some way when they are required to contribute to the VO objective. However, this exposure should be controllable by the partner who is performing the private process. In this respect, process views provide an exposure technique for internal processes and can be deployed in the administrative domains of assigned partners. Process views and internal processes are mapped to each other, including modelling rules to ensure consistency between both.

Figure 6:
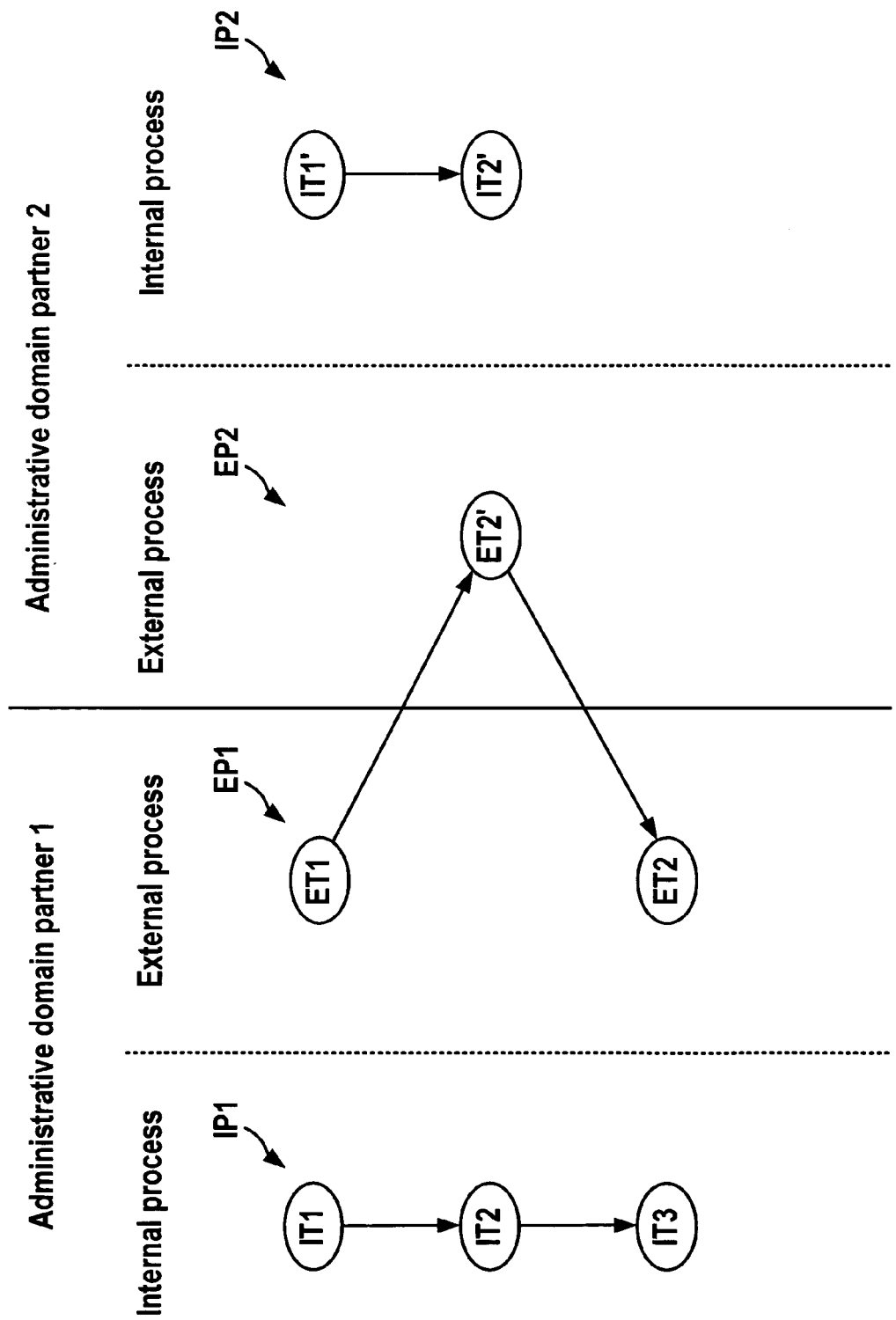
FIG. 6 is an example of a collaborative process model where two partners are involved.

FIG. 6 illustrates an example of a collaborative process model where two partners are involved. Each partner has an administrative domain for defining internal process flows. The first partner has an internal process flow IP1 including the tasks IT1, IT2 and IT3. The second partner has an internal process flow IP2 including the tasks IT1' and IT2'.

The first partner exposes a process view (external process EP1) of the internal process IP1 to the second partner. The external process EP1 includes only two tasks EP1 and EP2, wherein EP1 corresponds to IT1 and EP2 corresponds to IT3. IT2 is not exposed.

The second partner exposes a process view (external process EP2) of the internal process IP2 to the first partner. The external process EP2 includes only the tasks EP1', which corresponds to IT1'. IT2' is not exposed.

The described process model addresses security requirements in VO process collaborations on a basic level. Exposure and privacy of internal processes is addressed. When combining this model with the concept of control tasks and control contexts, secure process enactment in a VO is enabled through the more flexible security model that can dynamically react to events from integrated subsystems and alter the process flow during runtime. Such events may originate from subsystems, such as a monitoring subsystem which generates notification events, or from a policy subsystem allowing adapted policies.

For example, IT2 can be a control task to enforce a control aspect on the task IT3. In this case, the control task IT2 is intended to be used locally within the administrative domain of the first partner.

The process modelling unit can be used to start modelling the collaborative process model (e.g., graphically or writing XML) with a so-called choreography, for example, according to the Web Services Choreography Description Language standard (WS-CDL). Then external and internal processes may be derived automatically or manually. In one implementation, external processes can be specified in abstract Business Process Execution Language (BPEL) and internal processes as executable BPEL. This approach allows one to use recursive process definitions and, therefore, involves a high degree of flexibility. In another implementation, internal processes can be implemented as executable BPEL processes and external processes as Web Services Description Language (WSDL) interface specifications. In state of the art BPEL engines a BPEL process is always deployed along with its interface description (e.g., in WSDL). Dynamic control aspects may be semantically annotated, e.g., by means of WS-Policy statements.

For example, the collaborative process model can then be deployed as an executable process model and an interface description to the process execution unit for executing the corresponding process instance. For example, the process execution unit is run by the same administrative domain that runs the process modelling unit and is configured for access to and from respective services of the other administrative domains.

In another implementation each administrative domain has its own process execution unit. In this case, only tasks of the collaborative process model that belong to a specific administrative domain are deployed to the specific domain to be executed by the respective process execution unit. That is, there can be multiple, administrative domain specific process instances for one collaborative process model, where each administrative domain specific process instance includes the task instances of the respective administrative domain.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer system for controlling a workflow process, comprising:

a process modelling unit configured to define a process model with at least a first task and a second task, wherein the second task needs to comply with a control aspect and depends on the first task, and further configured to insert into the process model a control task between the first and the second task, wherein the control task at design time is a generic task included in anticipation of a control aspect specific function being required during runtime to support a control decision with respect to the control aspect, and thereby enforce the control aspect on the second task by using a control service of a subsystem from among a plurality of control services; and a process execution unit having access to a generic control context that includes generic control metadata relevant to selection and implementation of the plurality of control services, the process execution unit configured to generate a process model instance from the process model and to instantiate the control context to obtain a control context instance that includes current values of the generic control metadata existing in conjunction with execution of the process model instance, thereby representing a current state of the process model instance, the process execution unit being further configured to execute the process model instance at runtime, including executing the control task instance by using the control context instance to determine the control aspect specific function needed to support the control decision, and to thereby invoke the control service according to the control aspect.

2. The system of claim 1, wherein an extension role is assigned to the control task instance, wherein the extension role is associated with the control aspect specific function that is configured to support the control decision with respect to the control aspect at runtime.

3. The system of claim 2, wherein the extension role is configured to capture real-time monitoring data from a monitoring subsystem.

4. The system of claim 1, wherein the generic control context is stored separately from the process execution unit.

5. The system of claim 1, wherein the generic control context comprises the generic control metadata that includes one or more of the following metadata:
process instance metadata, authorization metadata, policy metadata, monitoring metadata, trust metadata, and/or secure layer access metadata.

6. The system of claim 1, wherein the control context instance has a lifetime that corresponds to the lifetime of the process model instance.

7. The system of claim 1, wherein the control task instance is associated with a control task state, the control task state being configured to capture a control decision relevant subset of the control context instance for the control task instance.

8. The system of claim 1, wherein the process execution unit is configured to set attributes of the control task instance by using metadata information of the control context instance.

9. The system of claim 1, wherein the control aspect includes one or more of a security aspect or a policy aspect or a trust aspect or a monitoring aspect.

10. The system of claim 1, wherein the control service is provided by a trusted control system.

11. The system of claim 1, wherein the process model includes a collaborative process model that comprises tasks of a first and at least a second administrative domain.

12. The system of claim 11, comprising a further process execution unit configured to generate a further process model instance from the collaborative process model, wherein the process model instance comprises first task instances of tasks that belong to the first administrative domain and the farther process model instance comprises second task instances of tasks that belong to the second administrative domain.

13. The system of claim 11, wherein the process model instance comprises a first task instance of an internal first administrative domain task that is invisible for the further process model instance, and the further process model instance comprises a second task instance of an internal second administrative domain task that is invisible for the process model instance.

14. A method for controlling a workflow process, the workflow process being represented by a process instance and comprising at least a first task instance and a second task instance, wherein the second task instance is associated with a control aspect and further comprising a control task instance to enforce the control aspect on the second task instance; the method comprising:
instantiating, during runtime of the process instance, a control context that includes generic control metadata relevant to selection and implementation of a plurality of control services, to thereby obtain a control context instance;
instantiating an extension role, wherein the extension role is a control aspect specific function configured to support a control decision with respect to the control aspect;
assigning the extension role to the control task instance during runtime of the process instance;
setting attributes of the control task instance by retrieving a control task instance specific attribute data subset from the control context instance;
executing the control task instance according to the assigned extension role;
invoking a control service of a subsystem from among the plurality of control services, according to the extension role and the specific attribute data subset of the control task instance;
receiving a control service decision from the control service, wherein the control service decision corresponds to the control decision for the control aspect; and
controlling the process flow of the process instance according to the control service decision.

15. The method of claim 14, wherein the control context captures metadata that characterize a process state of the process instance.

16. The method of claim 14, wherein upon having assigned the extension role, the control context includes references to control service subsystems which in turn handle confidential data.

17. The method according to claim 14, wherein the control context is partitioned according to control service subsystems which are callable by the control task instance.

18. The method according to claim 14, wherein the extension role is instantiated as a structured document from a corresponding template in an extension role repository.

19. The method of claim 18, wherein the extension role is assigned by an automated subsystem on the basis of the structured document.

20. The method according to claim 14, wherein the control decision relates to one or more of the following control aspects: security aspect, trust aspect, monitoring aspect, and/or policy aspect.

21. A computer program product comprising instructions tangibly embodied on a computer readable storage medium, that, when loaded into a memory of a computer system cause at least one processor of the computer system to:
generate a process instance from a process model, the process instance including a control task instance between a first task instance and a second task instance, the control task instance being instantiated from a control task determined at design time of the process model as a generic task included in the process model in anticipation of a control aspect specific function being required during runtime to support a control decision with respect to a control aspect governing execution of the second task instance, and thereby enforce the control aspect on the second task instance using a control service of a subsystem from among a plurality of control services;
instantiate a control context to capture a current state of the process instance within a control context instance, wherein the control context includes generic control metadata relevant to selection and implementation of the plurality of control services, and wherein the control context instance includes current values of the generic control metadata existing in conjunction with execution of the process instance; and
enforce the control aspect on the second task instance at the control task instance, based on the first task instance and on the control context instance, including executing the control task instance by using the control context instance to determine the control aspect specific function needed to support the control decision, and to thereby invoke the control service according to the control aspect.

22. The computer program product of claim 21 wherein the control context instance has a lifetime that corresponds to a lifetime of the process instance.

* * * * *